(12) United States Patent
Georges

(10) Patent No.: US 11,752,671 B2
(45) Date of Patent: Sep. 12, 2023

(54) PROCESS FOR PRODUCING MOTOR VEHICLE SEAT CUSHIONING

(71) Applicant: TESCA FRANCE, Paris la Défense (FR)

(72) Inventor: Laurent Georges, Roizy (FR)

(73) Assignee: TESCA France, Paris (FR)

( * ) Notice: Subject to any disclaimer, the term of this patent is extended or adjusted under 35 U.S.C. 154(b) by 177 days.

(21) Appl. No.: 17/296,586

(22) PCT Filed: Nov. 19, 2019

(86) PCT No.: PCT/EP2019/081726
§ 371 (c)(1),
(2) Date: May 25, 2021

(87) PCT Pub. No.: WO2020/109069
PCT Pub. Date: Jun. 4, 2020

(65) Prior Publication Data
US 2022/0001583 A1 Jan. 6, 2022

(30) Foreign Application Priority Data
Nov. 26, 2018 (FR) ...................................... 1871855

(51) Int. Cl.
*B29C 44/12* (2006.01)
*B29C 44/14* (2006.01)
(Continued)

(52) U.S. Cl.
CPC ........ *B29C 44/1285* (2013.01); *B29C 44/145* (2013.01); *B60N 2/7017* (2013.01); *B29K 2675/00* (2013.01); *B29L 2031/58* (2013.01)

(58) Field of Classification Search
CPC . B29C 44/1285; B29C 44/145; B60N 2/7017; B29K 2675/00; B29L 2031/58
See application file for complete search history.

(56) References Cited

U.S. PATENT DOCUMENTS 4,547,920 A * 10/1985 Hulsebusch .............. B26F 1/26
264/156
5,254,641 A * 10/1993 Alex ....................... C08L 75/04
521/137
(Continued)

FOREIGN PATENT DOCUMENTS

DE 102004027079 A1 12/2005
EP 0463981 A2 1/1992
(Continued)

OTHER PUBLICATIONS

International Search Report issued in corresponding application No. PCT/EP2019/081726 dated Feb. 14, 2020.

*Primary Examiner* — Philip F Gabler
(74) *Attorney, Agent, or Firm* — Murtha Cullina LLP

(57) ABSTRACT

The invention relates to a method for creating a motor vehicle seat cushion. The inventive method provides for a cover having a format of a complex comprising a layer of covering material and a sublayer of elastically compressible foam, and for arranging on the sublayer a film based on thermoplastic polyurethane. The film has a melting point and a melt mass-flow index that breaks down under the action of the heat released during the formation of the foam. The film is provided with a reinforcing thin-film to form a two-layer barrier against the penetration of foam. The reinforcing thin-film is based on a thermoplastic polyurethane with a melting point higher than that of the film and has a melt mass-flow index lower than that of the film, to have greater strength than the film so that the reinforcing thin-film breakdown under the action of heat is delayed.

5 Claims, 1 Drawing Sheet

(51) Int. Cl.
*B60N 2/70* (2006.01)
*B29K 675/00* (2006.01)
*B29L 31/58* (2006.01)

(56) References Cited

U.S. PATENT DOCUMENTS

| | | | | |
|---|---|---|---|---|
| 5,294,386 | A * | 3/1994 | Roth | B29C 67/202 |
| | | | | 264/46.6 |
| 5,534,097 | A * | 7/1996 | Fasano | B29C 66/8181 |
| | | | | 156/212 |
| 5,851,457 | A * | 12/1998 | Peterson | B29C 44/146 |
| | | | | 264/102 |
| 6,508,963 | B1 * | 1/2003 | Jaillet | B29C 44/1209 |
| | | | | 264/46.4 |
| 9,017,799 | B2 * | 4/2015 | Chu | B32B 27/08 |
| | | | | 428/178 |
| 9,527,268 | B2 * | 12/2016 | Preisler | B32B 27/12 |
| 2004/0259448 | A1 * | 12/2004 | Nahmias | B32B 5/245 |
| | | | | 428/354 |
| 2016/0280838 | A1 * | 9/2016 | Lambert | C08J 9/14 |
| 2017/0218154 | A1 * | 8/2017 | Huang | C08J 9/18 |
| 2019/0270226 | A1 * | 9/2019 | Georges | B29C 44/1285 |

FOREIGN PATENT DOCUMENTS

| | | |
|---|---|---|
| FR | 2868982 A1 | 10/2005 |
| WO | 2018020149 A1 | 2/2018 |

* cited by examiner

PROCESS FOR PRODUCING MOTOR VEHICLE SEAT CUSHIONING

CROSS-REFERENCE TO RELATED APPLICATIONS

This application claims the benefit of International application number PCT/EP2019/081726, filed Nov. 19, 2019 and French application number 1871855, filed Nov. 26, 2018 the entire contents of which are incorporated herein by reference.

TECHNICAL FIELD

The invention relates to a method of making a motor vehicle seat cushion, a cushion made by such a method and a motor vehicle seat provided with such a cushion.

It is known, in particular from the document WO-2018/020149-A1, to implement a method for making a motor vehicle seat cushion, said method comprising the following steps:
  providing a cover comprising a format of a complex comprising a layer of a covering material and a sublayer of an elastically compressible foam,
  setting said format in place within a mould defining a moulding cavity, said covering layer being disposed against the wall of said cavity,
  disposing a film based on thermoplastic polyurethane over said sublayer,
  injecting an elastically compressible foam precursor mixture into said cavity, to make a padding block, the film having a melting point and a melt mass-flow index such that it breaks down under the action of heat released during the formation of the foam of the block, in order to enable overmoulding of the sublayer by the block substantially without penetration of the foam of the block into the thickness of the sublayer,
    after expanding the foam, demoulding the obtained cushion.

With such a method, a cushion is made whose cover is secured, at least through the format, to the padding block, which avoids having to use biasing means such as those conventionally used in the case of covers mounted by draping on the block.

Furthermore, the film has broken down under the action of heat released during the formation of the foam of the block, in order to enable overmoulding the sublayer of the block.

And, through the proper selection of the melting temperature and of the melt state fluidity of the film, this overmoulding operation is done substantially without any penetration of the foam of the block into the thickness of the sublayer.

Indeed, the film progressively breaks down under the action of heat, which enables the forming foam to come into contact with the sublayer once it has taken, by its partial cross-linking, a consistence such that its penetration within the sublayer is minimised.

This results in the absence of a tight crust, altering the hygrothermal comfort of the cushion, which would have been caused by a penetration of foam within the sublayer.

However, in some cases, a film as recommended turns out to be not robust enough.

This is in particular the case when the cover has a complex geometry, compelling the film to undergo considerable deformations, which could lead to a premature breakdown of the film, in particular through a local drilling, which could lead to an overmoulding of the sublayer while the forming foam is still in a too liquid form, susceptible to penetrate substantially into the sublayer.

This is also the case when the cushion shall have a high bearing capacity—for example in the case of a seating cushion—which imposes filling the mould with more foam precursor mixture, which translates into an increased pressure in the moulding cavity which may lead to a phenomenon of the aforementioned film prematurely breaking down.

In such cases, a too rapid breaking down of the film is observed, which prevents the pressure rise of the foam within the mould at the end of its rise time and could lead to surface defects of the foam—in the form of craters (or "collapses")—resulting in a degradation of the comfort and/or aspect properties of the cushion.

And this phenomenon is exacerbated when a vacuum suction is used to pack the cover against the wall of the mould, which technique is applied in particular when the cover has a complex geometry, for example due to the presence of trimming trenches.

BACKGROUND

The invention aims to overcome this drawback.

To this end, and according to a first aspect, the invention provides a method for making a motor vehicle seat cushion, the method comprising the following steps:
  providing a cover comprising a format of a complex comprising a layer of covering material and a sublayer of an elastically compressible foam,
  setting the format in place within a mould defining a moulding cavity, the covering layer being disposed against the wall of the cavity,
  arranging a film based on thermoplastic polyurethane over the sublayer,
  injecting an elastically compressible foam precursor mixture into the cavity, to make a padding block, the film having a melting point and a melt mass-flow index such that it breaks down under the action of heat released during the formation of the foam of the block, in order to enable overmoulding the sublayer by the block substantially without penetration of the foam of the block into the thickness of the sublayer,
    after expanding the foam, demoulding the obtained cushion,
  the film is provided with a reinforcing sheet directed towards the cavity, to form a two-layer barrier against the penetration of foam, the sheet being based on thermoplastic polyurethane with a melting point higher than that of the film and with a melt mass-flow index lower than that of the film, to have an increased resistance in comparison with the film so that its breakdown under the action of the heat is delayed.

The reinforcing sheet has physical properties that are close to those of the film, but it is slightly more resistant to heat and has a slightly lower fluidity, which allows conferring on the boundary barrier an increased robustness enabling its delayed breaking down.

Thus, the pressure within the mould can be maintained for a prolonged time—for example for 10 to 15 seconds more—, thereby stabilising the form at the end of the rise time and avoiding the formation of craters on its surface.

It could have been provided to use only the sheet without the film but the Applicant has observed, following numerous tests, that the sheet has a lower bonding capability than the film, which does not allow guaranteeing sufficient cohesion between the sublayer and the block on completion of the overmoulding.

This is why a film provided with such a sheet serving mainly as a reinforcement is implemented whereas the film mainly fills a bonding function.

In fine, with the proposed arrangement, a particularly reliable manufacturing method is provided, further enabling, in particular in the case of a cushion whose cover has a complex geometry, the implementation of a vacuum suction packing of the cover against the wall of the cavity without any risk of the two-layer barrier prematurely breaking down.

According to other aspects, the invention provides a cushion made by such a method and a motor vehicle seat comprising such a cushion.

BRIEF DESCRIPTION OF THE DRAWINGS

Further features and advantages of the invention will come out in the following description, made with reference to the appended figures, wherein.

DETAILED DESCRIPTION

Figure 1:
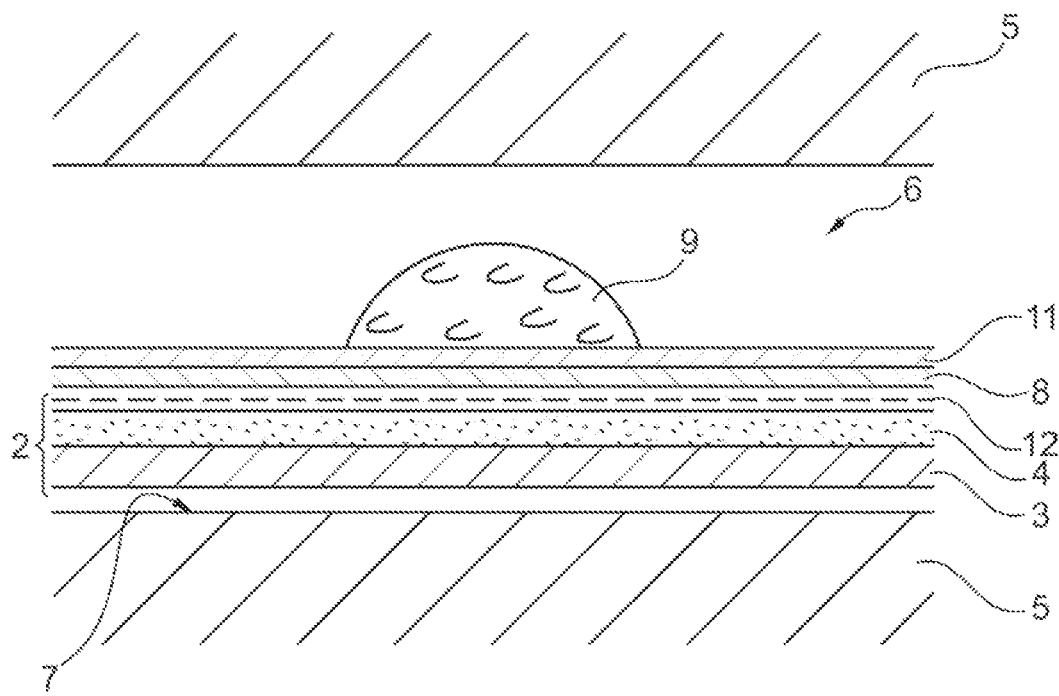
FIG. 1 is a schematic partial sectional view of a cushion during manufacture according to one embodiment, the foam precursor mixture having just been injected in the mould.
Figure 2:
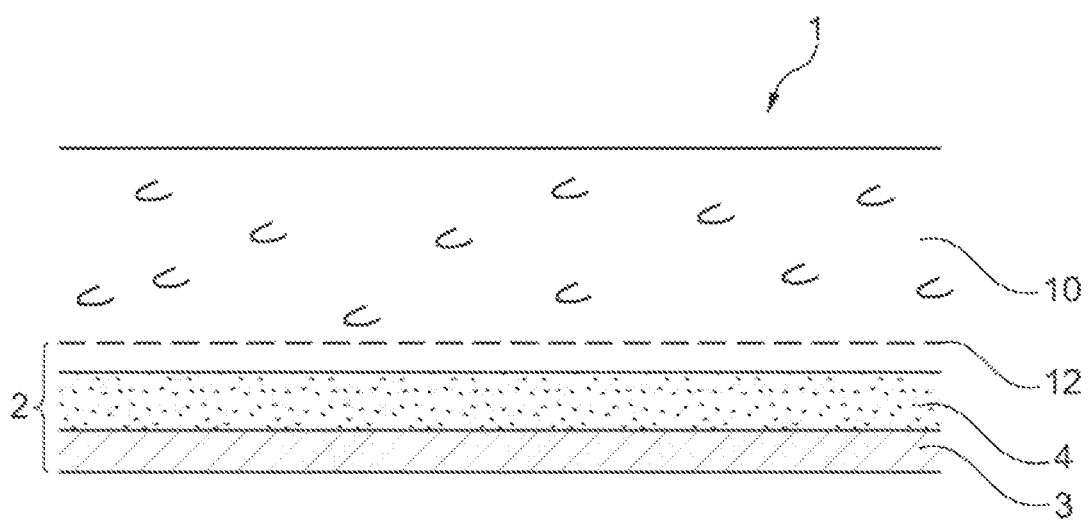
FIG. 2 is a schematic partial sectional view of the cushion of FIG. 1 once completed.

Referring to the figures, there is described a method for making a cushion 1 of a motor vehicle seat, the method comprising the following steps:
- providing a cover comprising a format 2 of a complex comprising a layer of a covering material 3 and a sublayer 4 of an elastically compressible foam,
- setting the format in place within a mould 5 defining a moulding cavity 6, the covering layer being disposed against the wall 7 of the cavity,
- disposing a film 8 based on thermoplastic polyurethane over the sublayer,
- injecting an elastically compressible foam precursor mixture 9 into the cavity, to make a padding block 10, the film having a melting point and a melt mass-flow index such that it breaks down under the action of heat released during the formation of the foam of the block, in order to enable overmoulding of the sublayer by the block substantially without penetration of the foam of the block into the thickness of the sublayer,
- after expanding the foam, demoulding the obtained cushion 1,
- the film is provided with a reinforcing sheet 11 directed towards the cavity, to form a two-layer barrier against the penetration of foam, the sheet being based on thermoplastic polyurethane with a melting point higher than that of the film and with a melt mass-flow index lower than that of the film, to have an increased resistance in comparison with the film in order to be broken down with a delay under the action of the heat.

In particular, the melt mass-flow index are measured according to the standard NF T 51-016 in force on the application filing date, at 190° C. with a forced-flow capillary rheometer whose piston is loaded with a 2.160 kg mass.

In particular, the melting points are measured through a differential scanning calorimetry (DSC), according to the standard ISO 11357 in force on the application filing date.

According to one embodiment:
- the film 8 has a melting point comprised between 45 and 52° C. and a melt mass-flow index comprised between 17 and 26 g/10 min,
- the sheet 11 has a melting point comprised between 53 and 60° C. and a melt mass-flow index comprised between 6 and 16 g/10 min.

More particularly, according to one embodiment:
- the film 8 has a melting point comprised between 48 and 52° C. and a melt mass-flow index comprised between 22 and 26 g/10 min,
- the sheet 11 has a melting point comprised between 53 and 57° C. and a melt mass-flow index comprised between 12 and 16 g/10 min.

Many tests have enabled the Applicant to observe excellent results with a film 8 and a sheet 11 having such characteristics.

According to one embodiment, each of the film 8 and the sheet 11 has a thickness comprised between 7 and 20 microns.

According to one embodiment, the polyol used to make the film 8 is polyester based.

According to one embodiment, the polyol used to make the sheet 11 is polyester based.

According to one embodiment, the isocyanate used to make the film 8 comprises an aromatic group.

According to one embodiment, the isocyanate used to make the sheet 11 comprises an aromatic group.

According to one embodiment, the foam sublayer 4 has a density of 0.028±0.002, which usually corresponds to a poor quality of the foam used for covers associated to a padding block by draping and not by overmoulding the cover by the block.

The use of such a low-cost sublayer 4 allows making a cushion 1 with a reduced cost.

The use of such a sublayer 4 is made possible by the use of the film 8 provided with the sheet 11 as described hereinabove.

According to one embodiment, the foam sublayer 4 is polyurethane based.

According to one embodiment, the foam sublayer 4 has a thickness comprised between 1.5 and 2 mm.

According to the represented embodiment, the foam sublayer 4 is provided, on its outer face, with a protective cloth 12, in particular with a rectangular or circular mesh pattern.

According to a represented embodiment, the cover comprises a second format associated edge-to-edge, in particular by sewing, to the first format 2, the second format not being overmoulded by the padding block 10.

According to one embodiment, the second format is located at the lateral portion of the cushion 1, its dissociation from the padding block 10 allowing for a better strength of the block with regards to the bending it undergoes when passengers get in/out of the vehicle.

According to one embodiment, the foam of the block 10 has a different density depending on whether it is located opposite the first 2 or second format, the foam having in particular an increased density at the lateral portions of the cushion 1, to enable a firm lateral support of the passenger.

There is now described a cushion 1 for a motor vehicle seat made by such a method, the cushion comprising:
- a cover comprising a first format 2, the format comprising a layer of a covering material 3 and a sublayer of an elastically compressible foam 4, in particular polyurethane based,
- a padding block 10 made of an elastically compressible foam, the block overmoulding the format while leaving the sublayer substantially free of foam into the thickness thereof.

Finally, a non-represented motor vehicle seat is described, comprising such a cushion 1, the cushion being associated, by the periphery of the cover, to a framework of the seat.

In order to achieve the association of the cushion 1 on the seat framework, profiles are particularly used attached, for example by sewing, at the periphery of the cover, the profiles nesting into anchor portions provided on the framework.

What is claimed is:

1. A method of making a cushion for a motor vehicle seat, the method comprising:
    providing a cover having a format of a complex comprising a layer of covering material and a sublayer of elastically compressible foam,
    setting the format in place within a mould defining a moulding cavity, the layer of covering material being disposed against a wall of the moulding cavity,
    arranging a film based on thermoplastic polyurethane over the sublayer,
    injecting an elastically compressible foam precursor mixture into the moulding cavity, making a padding block, the film having a melting point and a melt mass-flow index that breaks down when subjected to the heat released during the formation of the foam of the block, enabling overmoulding of the sublayer by the block without substantial penetration of the foam of the block into the thickness of the sublayer,
    after expanding the foam, demoulding the obtained cushion,
    the method wherein the film is provided with a reinforcing sheet directed towards the cavity, to form a two-layer barrier against the penetration of foam, the reinforcing sheet being based on thermoplastic polyurethane with a melting point higher than that of the film and with a melt mass-flow index lower than that of the film, to have an increased resistance in comparison with the film in order to be broken down with a delay under the action of the heat released during the formation of the foam of the block.

2. The method according to claim 1, wherein:
    the film has a melting point between 45° C. and 52° C. and a melt mass-flow index between 17 g/10 min and 26 g/10 min, and
    the reinforcing sheet has a melting point comprised between 53° C. and 60° C. and a melt mass-flow index comprised between 6 g/10 min and 16 g/10 min.

3. The method according to claim 2, wherein:
    the film has a melting point between 48° C. and 52° C. and a melt mass-flow index comprised between 22 g/10 min and 26 g/10 min, and
    the reinforcing sheet has a melting point between 53° C. and 57° C. and a melt mass-flow index comprised between 12 g/10 min and 16 g/10 min.

4. The method according to claim 1, wherein each of the film and the reinforcing sheet has a thickness comprised between 7 microns and 20 microns.

5. The method according to claim 1, wherein the foam sublayer has a density of 0.028±0.002.

* * * * *